July 4, 1933.   G. K. SCRIBNER   1,916,692
MOLDING OF PLASTIC ARTICLES
Filed May 5, 1930
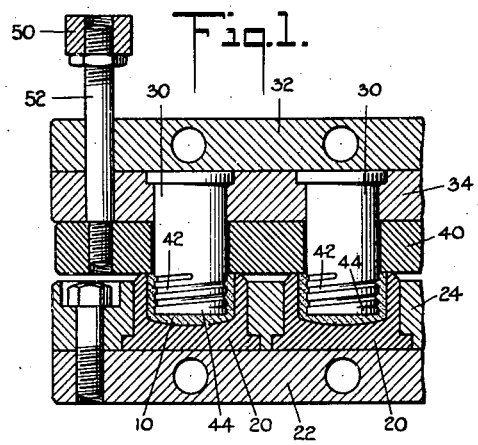
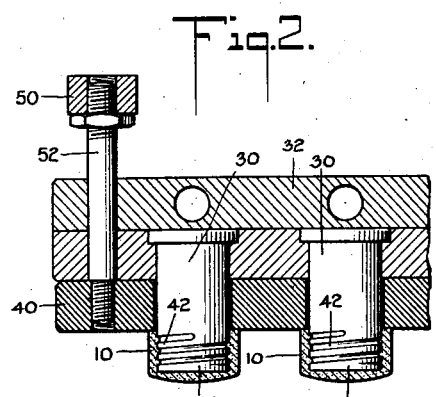
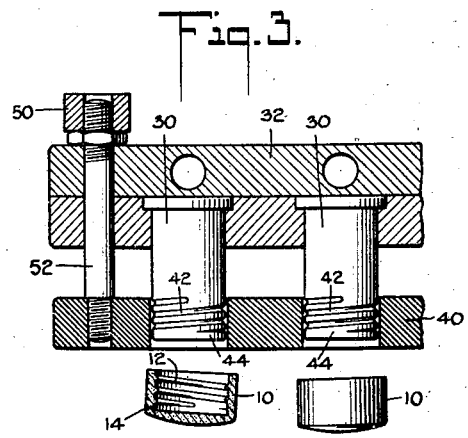
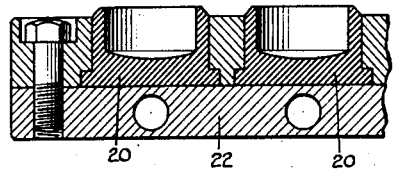
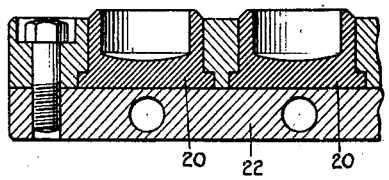
INVENTOR
George K. Scribner
BY
ATTORNEYS Patented July 4, 1933

1,916,692

UNITED STATES PATENT OFFICE

GEORGE K. SCRIBNER, OF BOONTON, NEW JERSEY, ASSIGNOR TO BOONTON MOLDING COMPANY, OF BOONTON, NEW JERSEY, A CORPORATION OF NEW JERSEY

MOLDING OF PLASTIC ARTICLES

Application filed May 5, 1930. Serial No. 449,852.

REISSUED

This invention relates to the molding of plastic articles, and more particularly articles made of phenolic condensation products and having threads or other transverse ridges or recesses therein. Plastics such as synthetic resins, especially those known as phenolic condensation products, are manufactured by molding the same under heat and pressure.

In the manufacture of such articles it frequently happens that the configuration of the article is such that it seems naturally adapted to be molded in a simple one or two part mold, and to be removed therefrom in a certain preferred direction, except that the article may include a ridge, undercut, or recess which extends transversely of the proposed direction of removal. In such cases, it has been the practice to use a more complex mold so as to make it possible to extract the molded article therefrom without injury to the recess or ridge. The primary object of my invention is to make possible the molding of such articles while retaining the simplicity of method and the simplicity of apparatus which would characterize the manufacture of the article in the absence of such transverse ridges or undercuts.

Instances when this problem arises are many, as, for example, the provision of an insulation snap cover for switches and the like, or the use of annular mating recess and ridge on the halves of a spool which are subsequently snapped together. One situation has proven particularly troublesome and difficult to solve, regardless of the expense which the manufacturer is willing to undertake for machinery and equipment, and that is the provision of an annular recess at the inside of a molded bottle cap for holding a liner such as cork or rubber in place within the cap. To make such a recess by cutting it within the cap after the cap is molded, is not practicable, and to mold the recess in the cap directly when making the same has heretofore proved impossible. One of the objects of this invention is to overcome the foregoing difficulty and to make possible the molding of a liner recess in a bottle cap or like article.

Another common example of transverse ridges or recesses on molded articles is a screw thread. As now manufactured, threads are provided on such articles by threading an appropriate portion of the mold, and subsequently unscrewing the article from the mold by relative rotation thereof. This process is slow if performed by hand, and requires expensive and special equipment to perform by machine. Additional objects of my invention are to increase the speed of manufacture of said threaded, molded articles, to increase the capacity of each machine or press for a single heat, and, generally to obtain the advantages of the machine method with equipment as inexpensive and even greater in capacity per heat than that used for the hand method.

In either the hand or machine methods for molding screw threads, it was necessary for the molded article to have flat sides or knurling at some point in order to obtain sufficient grip on the article when separating the article and the mold by unscrewing one from the other. For example, it was impossible to make a bottle cap or a cover for a collapsible tube, and like articles, with a smooth outside or periphery, even when the polygonal sides used thereon were not wanted in the article, because they were needed during the manufacture of the same. Accordingly, still another object of my present invention is to make possible the manufacture of threaded articles which are smoothly finished on the unthreaded walls thereof.

To the accomplishment of the foregoing and such other objects as will hereinafter appear, my invention consists in the molding method steps and their relation one to the other as hereinafter are more particularly described in the specification and sought to be defined in the claims. The specification is accompanied by the drawing in which:

Fig. 1 illustrates the molding of threaded and recessed smoothly finished bottle caps;

Fig. 2 shows the first step in the removal of the caps from the mold; and

Fig. 3 illustrates the stripping of the caps from the core of the mold.

In working with phenolic condensation products, I have discovered that after the plastic molding condition and before molded articles of the character here considered completely set and harden to the durable and rigid condition which makes them so valuable in use, there is an intermediate state in which the material, though exceedingly hot, is sufficiently set so that it may be removed from the mold, and yet is elastic and resilient rather than rigid and hard. I have further found that this discovery may be applied to the fulfilment of all of the various above mentioned objects, for an article which is naturally adapted for removal from a mold in a certain direction, except for a transverse ridge or recess, may be molded exactly as though the ridge or recess were not present, and the resulting article may be stripped from the mold in spite of the presence of the ridge or recess, the latter being disregarded and taken care of by the elasticity of the molded material, particularly when the article is separated from the mold before the plastic composition has completely set. In the case of screw threads it is merely necessary to strip the threaded article directly from the mold before the composition has completely set, and without bothering to rotate the article and mold relative to one another in order to unscrew one from the other. Because simple axial or longitudinal movement is used to produce the thread and rotational movement is dispensed with, it is not necessary that the molded article have polygonal sides or be purposely knurled in order to facilitate the unscrewing operation. One very important feature of the present invention is that it makes it possible to provide a liner recess in bottle caps and the like, which it was heretofore impracticable, if not impossible, to obtain.

The method of my invention is described in the present case as applied to the manufacture of bottle caps which are made of phenolic condensation product and which are internally threaded to fit the neck of the bottle, which are provided with a lining recess, and which have a smoothly finished exterior. Such a cap is shown in section and in elevation in Fig. 3, in which it will be seen that the cap 10 has a perfectly smooth exterior finish even though provided with the internal thread 12, and in addition, that the cap is provided with an annular recess or undercut 14 for receiving a liner. Such a liner recess is exceedingly valuable because liners are apt to fall out in shipping and handling before assembly, thereby necessitating replacement and causing a loss, and also fall out when the cap is unscrewed during use by the ultimate consumer.

To manufacture the bottle caps 10, a plurality of outer molds 20 are mounted on a heated, say steam, platen 22, and locked thereto by a holding plate 24. A plurality of cores 30 are mounted on a steam platen 32 and locked thereto by a pin or core holding plate 34. The plates 24 and 34 serve to place and hold the molds 20 and cores 30 in accurate co-axial alignment, as well as to lock them against the faces of their respective platens. The upper and lower steam platens 32 and 22 are, respectively, mounted in any standard press, which may be mechanically or hydraulically operated. In addition to the elements so far described which are more or less conventional, a stripper plate 40 is provided, the use of which is explained subsequently.

A quantity of phenolic condensation product in the potentially reactive condition is placed in each of the molds 20, and the press is operated to clamp the upper and lower platens 32 and 22 together, thereby molding the condensation product in a plastic condition to take the desired shape of the finished cap 10, as is clearly evident from Fig. 1. It should be particularly noted that the cores 30 are provided not only with a screw thread 42 for forming the desired internal threads 12, but also with an annular ridge 44 for forming the undercut or recess 14.

After the caps have been molded to shape, and treated for sufficient length of time, preferably only slightly less than the conventional curing time, but necessarily before they have been allowed to cool to a completely set condition, with consequent undesired shrinkage, the press is opened, thereby separating the platens 22 and 32 and consequently the molds 20 and the cores 30. The caps 10 are drawn out of the molds 20 by reason of the screw threads 42 and ridge 44 on the cores 30.

In accordance with the prior method of manufacturing these articles, it was next necessary to unscrew the caps 10 from the cores or pins 30. This necessitated that the outer surface of the caps be polygonal in shape, so that a wrench could be used, and considerable time was needed to unscrew the caps by hand. Machines have been devised in which the core is rotated in order to unscrew it from the article, while the article is prevented from rotating by the mold. Although this method is quicker than the hand method, the machinery is expensive and specialized, and only a few caps are made at a time instead of, say, a hundred at one heat, as is possible with the present arrangement. Furthermore, it would be absolutely impossible to have a ridge such as the ridge 44 at the end of the core, and therefore no liner recess could be provided.

In contrast with the prior practice, in accordance with my method, after lifting the caps 10 from the molds 20, as is indicated in Fig. 2, the stripper plate 40 is moved downwardly relative to the platen 32, as is indicated in Fig. 3, thereby stripping the caps 10 directly from the pins or cores 30. When the press moves the upper platen 32 relative to a stationary lower platen 22, the desired movement of the stripper plate 40 relative to the platen 32 may be obtained most simply by so arranging the knockout bars 50, which are connected with the stripper plate 40 through rods 52, that the said knockout bars reach and bear against some fixed portion of the machine during the latter part of the upward movement of the platen 32. On the other hand, if the press lowers the platen 22 while the platen 32 remains stationary, the knockout bars 50 may be carried downwardly with the platen 22 near the end of the stroke of the press.

Contrary to natural expectation, the threads 12 are not sheared from the inside of the cap during the stripping operation, provided that this operation takes place before the material has completely hardened and set, for it seems to possess sufficient elasticity to yield during the stripping action, and yet to come back to size thereafter. It is preferable to remove the cap from the mold 20 before stripping the cap from the core 30, for two reasons, first, because the thread relation between the core and the cap is taken advantage of to draw the cap from the mold; and second, because the cap is permitted to expand freely during the stripping action when it is no longer encompassed by the mold. The thread used is preferably of the rounded type illustrated in the drawing, because this type is not noticeably marred or misshapen by the stripping action. While a V thread may be used, the finished thread, when the present process is employed, will no longer be a sharply defined V thread, but instead will become somewhat dulled or rounded by the stripping operation.

When the article being molded has a smooth outer face and a threaded inner face, or vice versa, it is preferable that the article be removed from the unthreaded portion of the mold before being stripped from the threaded portion of the mold for the reasons previously explained, but this sequence of steps is not essential. For example, I have employed the present method to manufacture caps or closures of containers for sticks of shaving soap, which caps are threaded internally to receive the stick of soap, and are also threaded externally for screwing the same into the cylindrical container. It is obvious that when removing the mold from whichever thread is first cleared, no free expansion at the opposite side of the cap is permitted, and yet the present process may be followed without injury to the thread, particularly when the depth of thread is not very great.

The process of my invention increases the manufactured output to a remarkable degree, for several reasons. In the first place, the stripping action itself is speedy. In the second place, a single stripping action strips all of the caps in the machine simultaneously.

In the third place, the capacity of a single machine is very great, because the molds may be placed immediately adjacent one another over the entire surface of the platen, for practically no clearance is needed between adjacent molds, such as is needed for wrenches, and the like, when the caps are unscrewed by hand. The time of treatment in the mold is not increased and preferably is slightly decreased. Furthermore, rejections are reduced, if not eliminated, because ordinarily the faults which lead to rejection in prior processes have been caused during the unscrewing of the caps, at which time marring and breakage frequently would take place. The machinery used is exceedingly simple and adaptable to changes in the article being molded. The threaded article may be given a smooth finish as is often desired for the sake of appearance.

In addition to the foregoing advantages of my invention, which deal with its application to the molding of screw threads, there are many other advantages which arise from the possibility of providing transverse and annular recesses and ridges without using a multiple part mold. The example specifically described, namely the provision of a liner recess in a bottle cap, is an especially valuable one because of the desirability of the recess, and because of the difficulty of providing such a recess by any other method, particularly when dealing with small articles, such as a cap for collapsible tubes, small bottle caps, and the like. Even in the case of large articles having external recesses or ridges which might be made with a multiple part mold, my invention is of advantage, because the article may be obtained without fins or lines at the points of separation of the multiple part mold, as well as because of the extreme simplification in apparatus and manufacturing process made possible thereby. These advantages apply to molded articles of any type which are undercut either internally or externally.

It will be apparent that while I have shown and described my invention in the preferred form, many changes and modifications may be made in the method disclosed, without departing from the spirit of the invention, defined in the following claims. The bottle cap producible by my method is not claimed herein, being claimed in my copending application Ser. No. 449,851, filed concurrently herewith.

I claim:

1. In the manufacture out of phenolic condensation product of a molded article naturally adapted by reason of its configuration for removal from a non-collapsible core in a preferred direction except for a ridge or recess extending in a direction transverse to the aforesaid preferred direction, the method which includes molding the condensation product about the core to the shape of the desired article including the ridge or recess, and stripping the article directly from the non-collapsible core by relatively moving the article and the non-collapsible core solely in the aforesaid preferred direction while the article is still hot, the presence of the ridge or recess on the core being disregarded and taken care of by the elasticity of the molded material.

2. In the manufacture out of phenolic condensation product of a molded article naturally adapted by reason of its configuration for removal from a mold in a certain direction except for a ridge or recess, the method which includes molding the condensation product under heat and pressure to the shape of the desired article including the ridge or recess, and stripping the article directly from the mold by relative movement solely in the aforesaid direction before the condensation product is completely set and while it is still hot, the presence of the ridge or recess being disregarded and taken care of by the elasticity of the incompletely set molded material.

3. In the manufacture out of phenolic condensation product of a molded article having a screw thread, by means of a threaded mold the threaded portion of which is integral and non-separable, the method which includes molding the condensation product to the shape of the desired article under heat and pressure, and stripping the article from the mold by relatively moving the article and the non-separable threaded portion of the mold solely in the direction of the axis of the thread while the article is till hot, and without relative rotation of the same, the presence of the thread being disregarded and taken care of by the elasticity of the molded material.

4. In the manufacture out of synthetic resin of a molded article having a screw thread, by means of a mold having an integral non-separable threaded portion and an unthreaded portion, the method which includes molding the condensation product to the shape of the desired article, removing the article from the unthreaded portion of the mold, and stripping the article from the threaded portion of the mold by relatively moving the article and the threaded portion of the mold solely in the direction of the axis of the thread, and without relative rotation of the same, while the article is still hot, the presence of the thread being disregarded and taken care of by the elasticity of the molded material.

5. In the manufacture out of phenolic condensation product of a molded article having a screw thread, by means of a mold having an integral non-separable threaded portion and an unthreaded portion, the method which includes molding the condensation product to the shape of the desired article under heat and pressure, removing the article from the unthreaded portion of the mold to permit expansion of the article, and stripping the article from the threaded portion of the mold before the composition is completely set and while it is still hot by relatively moving the article and the non-separable threaded portion of the mold solely in the direction of the axis of the thread, and without relative rotation of the same, the presence of the thread being disregarded and taken care of by the elasticity of the incompletely set molded article.

6. In the manufacture out of synthetic resin of a molded cap having a threaded interior, by means of an outer mold and a threaded non-collapsible core, the method which includes molding the condensation product between the mold and core to the shape of the cap, removing the core and cap from the mold, and stripping the cap directly from the core while the cap is still hot by relatively moving the cap and the non-collapsible core solely in the direction of the axis of the core, and without relative rotation of the same.

7. In the manufacture out of phenolic condensation product of a molded cap having a threaded interior, by means of an outer mold and a threaded non-collapsible core, the method which includes molding the condensation product between the mold and core under heat and pressure to the shape of the cap, removing the core and cap from the mold, and stripping the cap from the core before the cap is completely set and while it is still hot by simple relative movement of the cap and the core solely in the direction of the axis of the core and without relative rotation of the same, the presence of the thread being disregarded and taken care of by the elasticity of the incompletely set molded article.

8. In the manufacture out of phenolic condensation product of a molded cap having a circumferentially extending recess for holding a liner, by means of an outer mold and a non-collapsible annularly ridged core, the method which includes molding the condensation product between the mold and core under heat and pressure to the shape of the cap including the recess, removing the core and cap from the mold, and stripping the cap from the core before the condensation product is completely set and while it is still hot by simple relative movement of the cap and the non-collapsible core solely in the direction of the axis of the core.

9. In the manufacture out of phenolic condensation product of a molded cap having a threaded interior, and a circumferentially extending recess for holding a liner, by means of an outer mold and a non-collapsible threaded and annularly ridged core, the method which includes molding the condensation product between the mold and core under heat and pressure to the shape of the cap including the thread and recess, removing the core and cap from the mold, and stripping the cap from the core before the cap is completely set and while it is still hot by simple relative movement of the cap and the core solely in the direction of the axis of the core and without relative rotation of the same.

10. In the manufacture out of phenolic condensation product of a molded cap having a smooth exterior, a threaded interior, and a circumferentially extending recess for holding a liner, by means of a smooth outer mold and a non-collapsible threaded and annularly ridged core, the method which includes molding the condensation product between the mold and core under heat and pressure to the shape of the cap including the thread and recess, removing the core and with it the cap from the smooth outer mold, and stripping the cap from the non-collapsible core while the cap is still only partially set and while it is still hot by simple relative movement of the cap and the core solely in the direction of the axis of the core and without relative rotation of the same.

11. In the manufacture out of synthetic resin of a molded cap having a circumferentially extending recess for holding a liner, by means of an outer mold and a non-collapsible ridged core, the method which includes molding the condensation product between the mold and core under heat and pressure to the shape of the cap including the recess, removing the core and cap from the mold, and stripping the cap from the core while the cap is still hot by relatively moving the cap and the non-collapsible core in the direction in which the same would be moved if no ridge for the liner recess were provided, the presence of the ridge on the core being disregarded and taken care of by the elasticity of the molded material.

12. In the manufacture out of synthetic resin of a molded cap having a threaded interior and at the inner end of the thread a circumferentially extending recess for holding a liner, by means of an outer mold and a non-collapsible threaded and annularly ridged core, the method which includes molding the condensation product between the mold and the core under heat and pressure to the shape of the cap including the thread and recess, removing the core and cap from the mold, and stripping the cap from the non-collapsible core while the cap is still hot by relatively moving the cap and the non-collapsible core in the direction in which the same would be moved if no ridge for the liner recess were provided, the presence of the ridge on the core being disregarded and taken care of by the elasticity of the molded material.

13. In the manufacture out of phenolic condensation product of a molded article naturally adapted by reason of its configuration for removal from a mold in a certain direction except for a ridge or recess, the method which includes molding the condensation product under heat and pressure to the shape of the desired article including the ridge or recess, and stripping the article directly from the mold by relative movement solely in the aforesaid direction slightly before the material has completely reacted and while the material is elastic and still hot, the said article at the time of its removal containing sufficient latent heat to change the material to the desired condition or cure, the presence of the ridge or recess being disregarded during the stripping of the article from the mold and being taken care of by the elasticity of the incompletely set molded material.

14. A method of molding from synthetic resin an article which interlocks with the mold, comprising molding the article under suitable degrees of heat and pressure, stripping the article off a mold part while in a heated condition by pressure on the article, and then allow the article to set.

15. A method of molding from synthetic resin a hollow article having an undercut portion, comprising heating the resin in a mold to form the article and stripping the article therefrom while hot by pressure on the article, and then allowing the article to cool.

16. A method of molding a hollow article from a synthetic resin, comprising molding under the action of heat between the parts of a separable mold, the mold having a portion interlocking with the article, separating the mold parts and subsequently freeing the article from interlocking engagement with the mold part by springing it off the latter while hot, and then permitting the article to set.

17. A method of molding an undercut article from a synthetic resin, comprising the steps of molding under temperature and pressure, opening the shaping means to permit deformation of the article, stripping the article from the shaping means by deformation caused by pressure on the article while the material is still capable of deformation, and then allowing the article to set.

18. A method of molding a hollow undercut article from synthetic resin, comprising heating the material between the parts of a separable mold, separating the mold parts to permit deformation of the article and subsequently, while the material is hot, stripping the article from a mold part by pressure on the article, and then allowing the article to harden.

19. A method of molding from synthetic resin a hollow closure cap having an undercut portion which interlocks with a ridge on the mold, comprising heating the resin in the mold to form the closure cap, and springing the closure cap while hot over the aforesaid ridge on the mold during separation of the closure cap from the mold, and then allowing the closure cap to cool.

20. A method of molding a hollow closure cap having a liner recess and a screw thread therein, from a synthetic resin, comprising molding the closure cap under the action of heat between the parts of a separable mold, the mold having a thread-forming portion and a portion interlocking with the closure cap and forming the liner recess therein, separating the mold parts, and subsequently freeing the closure cap from the interlocking portion of the mold by spring the liner recess portion of the cap off the interlocking portion of the mold while the closure cap is still hot, and then permitting the closure cap to cool.

Signed at Boonton in the county of Morris and State of New Jersey this second day of May A. D. 1930.

GEORGE K. SCRIBNER.